Figure 1:
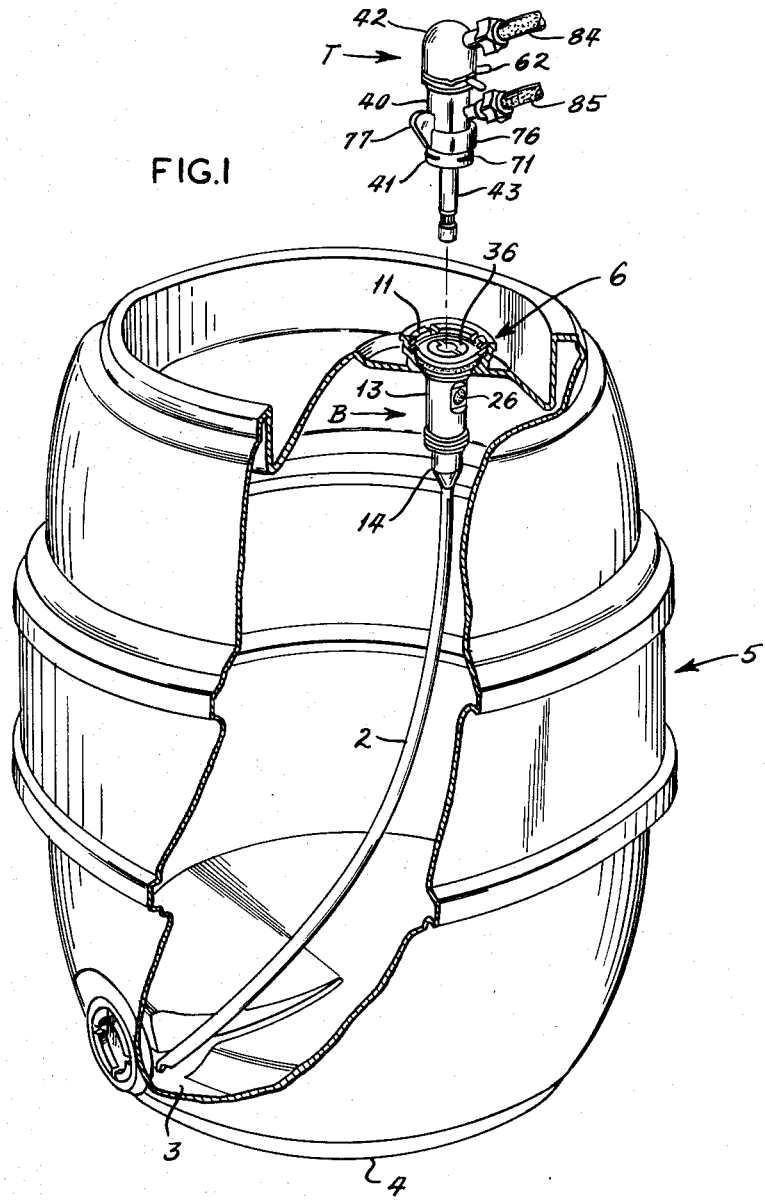

Nov. 27, 1962  V. H. CHATTEN  3,065,885
BEER BARREL TAPPING DEVICE
Filed Feb. 18, 1960  5 Sheets-Sheet 1

INVENTOR:
VICTOR H. CHATTEN
BY Gravely, Lieder & Woodruff
ATTORNEYS.

Nov. 27, 1962 V. H. CHATTEN 3,065,885
BEER BARREL TAPPING DEVICE
Filed Feb. 18, 1960 5 Sheets-Sheet 2
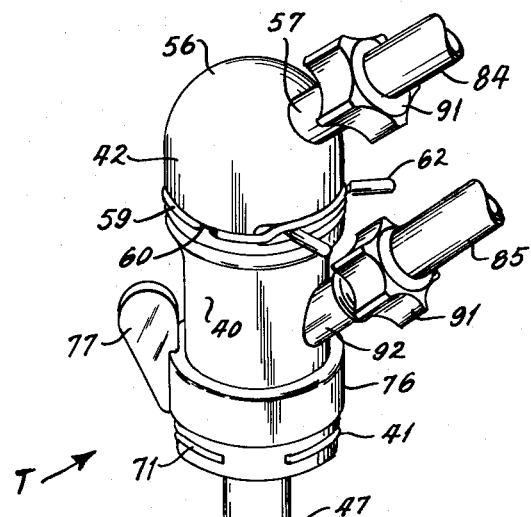
FIG.3
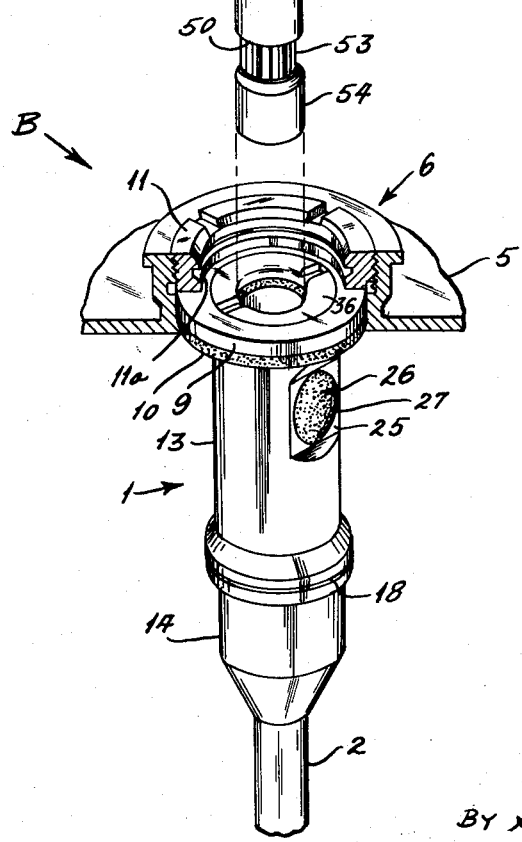
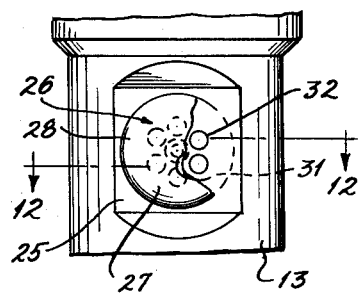
FIG.11
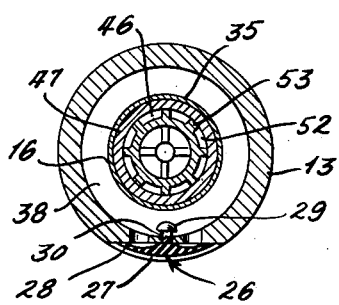
FIG.12
INVENTOR:
VICTOR H.CHATTEN
BY Gravely, Lieder & Woodruff
ATTORNEYS.

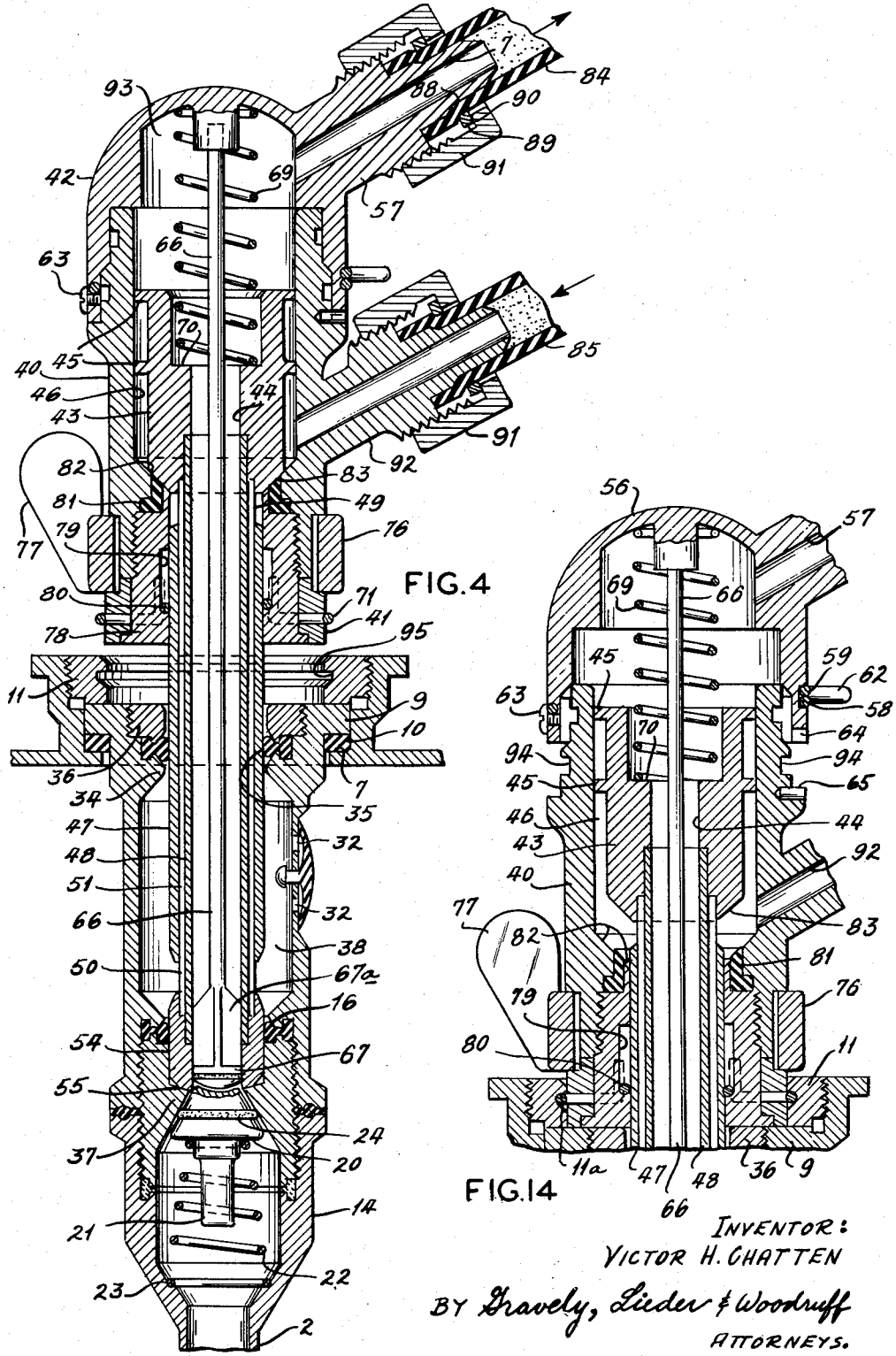

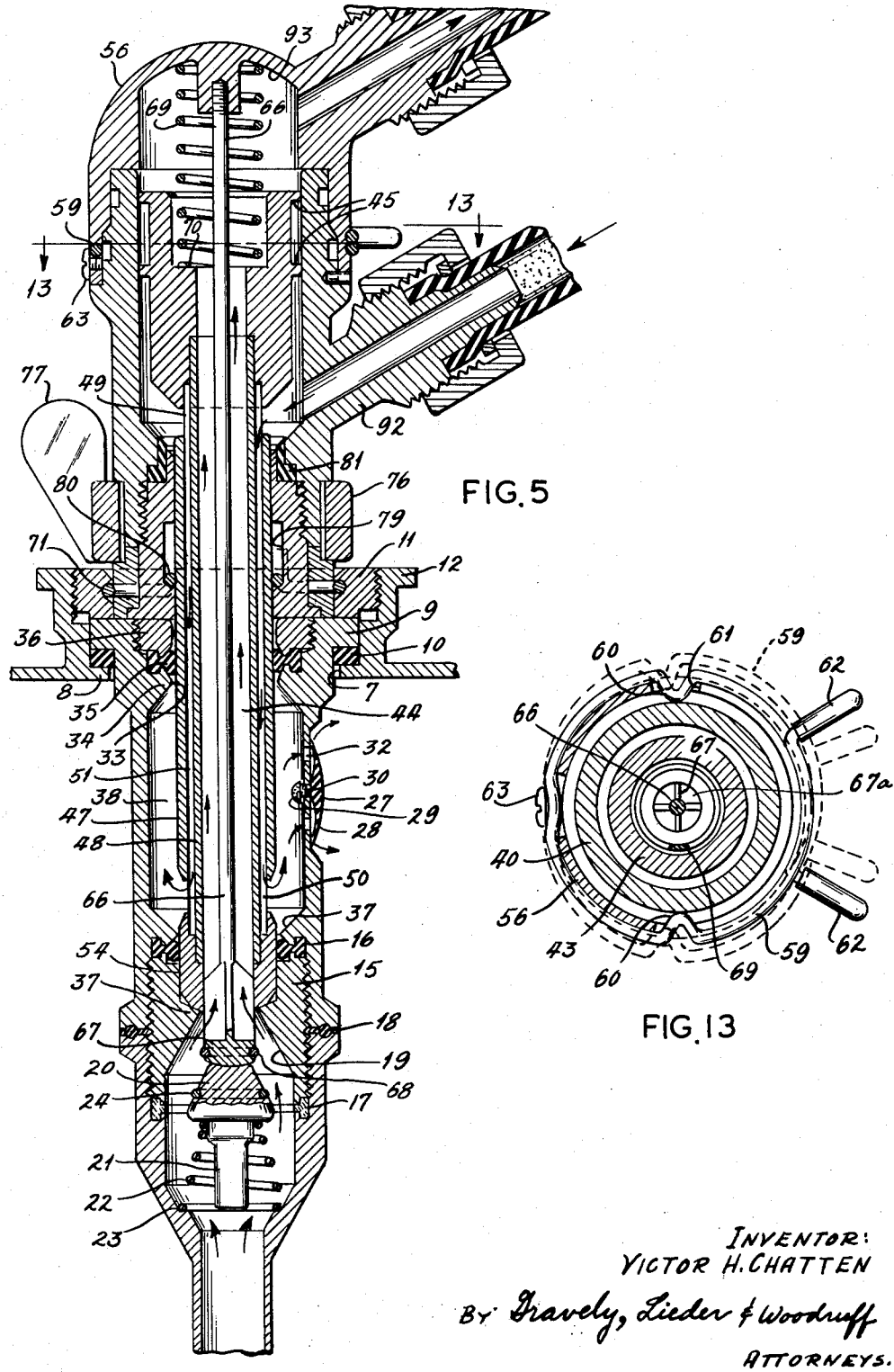

Nov. 27, 1962
V. H. CHATTEN
3,065,885
BEER BARREL TAPPING DEVICE
Filed Feb. 18, 1960
5 Sheets-Sheet 5
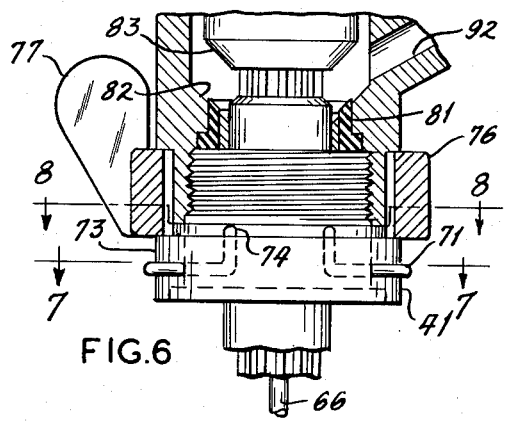
FIG.6
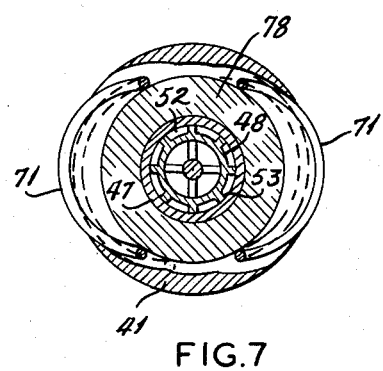
FIG.7
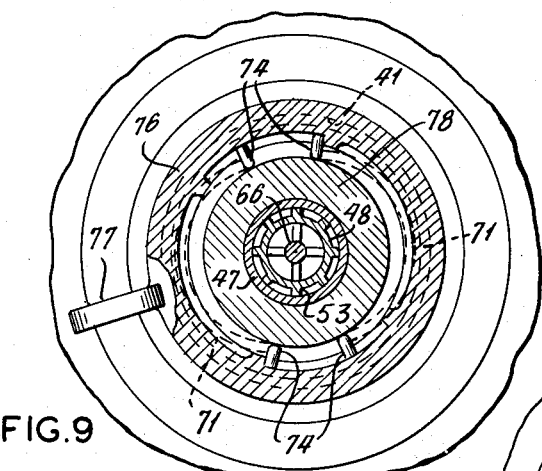
FIG.9
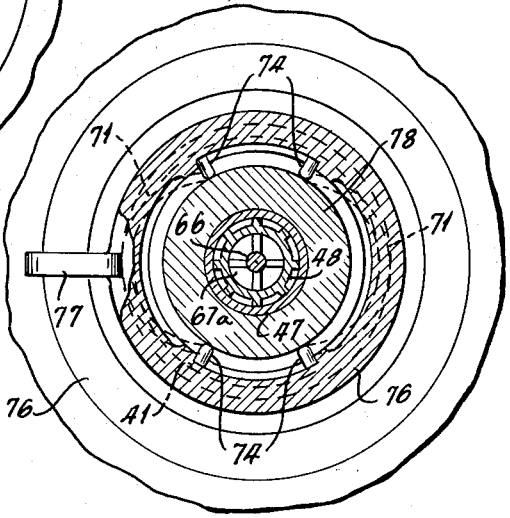
FIG.8
FIG.10
INVENTOR:
VICTOR H. CHATTEN
BY Gravely, Lieder & Woodruff
ATTORNEYS.

United States Patent Office 3,065,885
Patented Nov. 27, 1962

3,065,885
BEER BARREL TAPPING DEVICE
Victor H. Chatten, Torrance, Calif., assignor to Anheuser-Busch, Incorporated, St. Louis, Mo., a corporation of Missouri
Filed Feb. 18, 1960, Ser. No. 9,605
5 Claims. (Cl. 222—400.7)

This invention relates to a new and improved device for tapping beer barrels, and in particular, relates to a barrel unit and tap unit which can be used in connection with barrels or kegs of the type in common use today. These barrels have an upper opening of standard size.

At present there are several different types of beer barrel tapping arrangements which are in commercial use. One type in common use utilizes a beer barrel with an upper opening for receiving gas, such as carbon dioxide, and a lower opening for dispensing the beer. This arrangement requires two vents or fittings to be applied to the beer barrel. These fittings are rotated a quarter turn to secure them to the barrel. In addition, this arrangement requires a tilt base so that the barrel is tilted in order to dispense the last several ounces through the bottom opening of the barrel. The tilt base makes handling more difficult and requires the cooler cabinet for the barrel to be larger in order for the barrel to be placed therein without much difficulty.

One of the principal objects of the present invention is to provide a beer barrel tapping arrangement wherein only a single top connection is made by a speed coupling requiring only a straight push to make the connection. Another object is to eliminate the tilt base and to draw the beer to the last several ounces. Another object is to provide a barrel unit which does not displace much beer and which does not have to be removed for the high speed cleaning operation performed on automatic equipment. Another object is to provide a convenient flushing valve for a beer barrel tapping unit and to eliminate all valves except for the dual valve which supplies the $CO_2$ gas and draws off the beer.

Another object is to provide a single quick beer barrel connection which requires no additional labor in handling, loading or cleaning and which is tamper proof and universal to high and low pressure systems.

Another object is to provide a device for easily and quickly tapping a barrel of beer, said device having a simple barrel unit construction which admits of easy cleaning on high speed automatic equipment and a simple easily disassembled tap unit which may be easily and quickly cleaned.

These and other objects and advantages will become apparent hereinafter.

The present invention is embodied in a beer barrel tapping arrangement comprising a barrel unit and a tap unit which is connected to the barrel unit by a speed coupling for automatically allowing $CO_2$ gas to enter the barrel and beer to leave the barrel through said tap unit.

Figure 2:
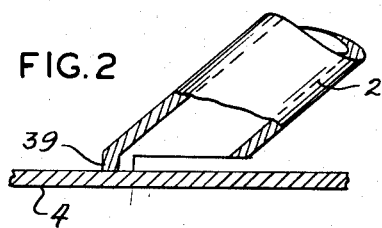

The invention also consists in the parts and in the arrangements and combinations of parts hereinafter described and claimed. In the accompanying drawings which form part of this specification and wherein like numerals and symbols refer to like parts wherever they occur:

FIG. 1 shows a preferred embodiment of my invention applied to a standard metal beer barrel of the type now in common use, with the tapping unit ready to be applied, FIG. 2 is an enlarged view of the foot portion of the curved beer tube, FIG. 3 is a view of the barrel and tap units, FIG. 4 is an enlarged vertical cross-sectional view of the tap unit snapped into the barrel unit just before the valves are opened, FIG. 5 is an enlarged vertical cross-sectional view of the tap unit snapped into the barrel unit showing the $CO_2$ valve and the beer valve open, FIG. 6 is an enlarged view of the locking arrangement for the tap unit with respect to the barrel unit, FIG. 7 is a horizontal cross-sectional view taken along the line 7—7 of FIG. 6, FIG. 8 is a horizontal cross-sectional view taken along the line 8—8 of FIG. 6, FIG. 9 is a horizontal cross-sectional view taken along the line 8—8 of FIG. 6 after the ring has been rotated several degrees clockwise to retract the springs, FIG. 10 is a fragmentary view of the fastening portion of the tap unit, FIG. 11 is a fragmentary view of the top portion of the barrel unit showing the flutter valve, FIG. 12 is a horizontal cross-sectional view taken along the line 12—12 of FIG. 11, FIG. 13 is a horizontal cross-sectional view taken along the line 13—13 of FIG. 5, the dotted lines showing the position of the projections and spring, which secure the tap head to the tap body, in their open position, and FIG. 14 is a fragmentary cross-sectional view showing the tap head in partially disassembled relation from the tap body.

Referring now to the drawings in detail, the barrel unit B comprises a valve casing 1 having a curved tube 2 extending downwardly therefrom to the outer portion 3 of the bottom 4 of the barrel 5. The barrel unit B is inserted through the upper barrel fitting 6 having a standard 1½ inch hole 7 surrounded by a flange 8. The barrel unit B has an upper flange 9 with the washer 10 therebelow which rests upon the flange 8 of the beer barrel fitting 6. A retaining ring 11 with an inner groove 11a therein is threaded into the collar 12 of the fitting 6 forcing the flange 9 against the beer barrel flange 8. This secures the barrel unit B in the barrel 5 in a leakproof manner.

The barrel unit B comprises an upper casing 13 and a lower casing 14 which terminates in the tube 2. A connector 15 is threaded into said casings 13 and 14. Suitable seals are provided between the parts, such rings 16 and 17 made from suitable substance such as neoprene, and a washer 18 preferably made from nylon. The connector 15 has a conical valve seat 19 therein adapted to receive the conical valve body or beer valve 20 having a stem 21 thereon which has a valve spring 22 in circumscribing relation, said spring 22 fitting against a shoulder 23 in the lower casing 14. A seal 24 is provided in the valve 20.

The upper casing 13 is provided with a flat cutout portion 25 having a flutter valve 26 therein. The flutter valve 26 has an enlarged head 27 with a thin outer thickness 28 and a retainer 29 with a stem 30 therebetween. The stem 30 slidably fits within a central opening 31 which is surrounded by a plurality of other openings 32 in the flat portion 25 in the side of the upper casing 13 through which $CO_2$ gas may pass. The flutter valve 26 is a one-way valve and prevents pressure in the barrel 5 from passing into the barrel unit B.

The upper portion of the upper casing 13 has an opening 33 formed by an enlarged portion 34 which supports an O ring 35 in cooperation with a retainer 36. A similar enlarged portion 37 helps support the O ring 16. The space between the O rings 16 and 35 is of larger diameter than the O rings and forms a chamber 38. The tube 2 is provided with a foot 39 to keep it in spaced relation from the bottom 4 of the barrel 5. The retaining ring 11 and retainer 6 may have suitable radial notches therein so that they may be rotated with a wrench.

The tap unit T comprises a body 40 with a fastener 41 at its lower end and a tap head 42 thereabove. An extension or piston 43 with an opening 44 therein is mounted in the tap head 42 and extends downwardly from the fastener 41. The piston 43 has two flanges 45 in its upper portion which are slidably received in the cavity 46 of the tap unit T with an extension having concentric tubes 47 and 48 extending therebelow. The outer tube 47 is shorter in length than the inner tube 48 at both top and bottom so as to form an inlet 49 at the top and an outlet 50 at the bottom. Thus, an annular gas passage 51 is formed for the $CO_2$ gas. This passage 51 is divided into smaller passages 52 by means of the spacers 53 which keep the outer tube 47 in spaced relation from the inner tube 48. The bottom portion 54 of the piston is provided with a conical or curved seat 55, which contacts the connector 15. The outer tube 47 and bottom portion 54 are contacted in sealing relation by the O rings 35 and 16 respectively.

The tap head 42 includes a dome portion 56 with a beer outlet 57 and a groove 58 for receiving a spring 59 with projections 60 extending inwardly through holes 61 in said tap head 42 and having finger portions 62 adapted to be moved together by the thumb and forefinger for releasing the tap head 42 from the tap unit T. The spring 59 is retained in position by a screw 63. The tap head 42 is oriented with respect to the tap body 40 by means of the notch 64 which fits over a lug 65 on the tap body 40. A plunger rod 66 extends downwardly from the dome 56 and terminates in a plunger 67 having cutout portions 67a and an O ring 68. A plunger spring 69 circumscribes the upper portion of the plunger rod 66 and is positioned between the dome 56 and a shoulder 70 in the piston 43.

The fastener 41 has a spring 71 mounted in a groove 72 in the lower portion 73 of the tap unit T. This spring 71 has upstanding and bent ends 74, one of which can be moved toward the other by projections 75 on a rotating band 76 having a thumb lug 77 thereon. The tap unit T also has a lower inner member 78 with an elongated groove 79 having an O ring 80 therein. A gas valve seal 81, preferably made of neoprene, is mounted in a gas valve seat 82 formed by the upper slanted edges of said member 78 and the tap body 40. The gas valve seal 81 extends slightly upwardly from the parts which hold it to form a leakproof seal between the gas valve 83, which is formed by the tapered lower portion of the piston 43, and the valve seal 81.

The tap head 42 contains the beer outlet 57 and is assembled to the piston 43 by inserting the plunger 67 and plunger rod 66 through the opening 44 in the piston 43 until the plunger spring 69 is compressed and the lug 65 in the tap head 42 receives the notch 64 so that the tap head 42 is properly oriented on the body 40 and the lock spring 59 can be snapped into locked position. The parts are thus joined to each other and act as a unitary tap unit T to which pressure tubing 84 and 85 for the outgoing beer and incoming $CO_2$ gas can be suitably secured by suitable hose connections 86.

As shown, such a hose connection 86 may have an extension 87 with a slanted shoulder 88 thereon which is used as a back stop for a metal ring 89 of predetermined diameter so that the inside annular face 90 of the nut 91 wedges the metal ring 89 and hose 84 against the slanted shoulder 88 to make a simple leakproof connection.

The tap unit body 40 is also provided with an inlet 92 for the $CO_2$ gas which has a hose connection 86 attached to it.

The operation required to tap a beer barrel is very simple with the present device. All that is required is for the operator to remove the tax seal and protective cap from the upper opening of a beer barrel 5, thereby exposing the opening in the barrel unit as best shown in FIG. 1. After the tap unit T has its beer line 84 connected to a suitable faucet (not shown) and its $CO_2$ line 85 to a source of $CO_2$ (not shown) at the proper pressure for dispensing draft beer (say 12 to 14 pounds for beer at 38° F.), the extension 43 of the tap unit T is simply inserted into the opening 33 in the barrel unit B and pressed straight downwardly until the spring 71 in the fastener 41 snaps into the groove 11a in the retaining ring 11 to lock the tap unit T to the barrel unit B. In so doing, the valves 83 and 26 are automatically opened to allow the $CO_2$ gas to pass from the $CO_2$ tank into the beer barrel 5, and the valve 20 is automatically opened to allow beer to pass upwardly through the tube opening 44 in the piston 43 to the beer hose 84 and then to the faucet (not shown).

As the extension of the tap unit T is inserted into the barrel unit B (as shown in FIG. 4) the gas valve 83 and the beer valve 20 are closed and remain closed even when the conical seat 55 at the bottom of the piston 43 first contacts the enlarged portion 37 of the connector 15. Continued downward force on the tap unit T causes the tap unit body 40 with the tap head 42 and fastener 41 to continue downwardly, but the piston 43 remains stationary with respect to the barrel 5 and barrel unit B. This in effect causes the piston 43 to move upwardly with respect to the tap body 40 to the position shown in FIG. 5. During this continued downward movement of the tap body 40, fastener 41, and tap head 42, the gas valve 83 opens since the valve 83 moves upwardly and away from the valve seat 82, and the beer valve 20 opens since the plunger 67 attached to the tap head 42 continues its downward movement to open the beer valve 20 by forcing it downwardly against the action of the spring 22 to open a passage 67a between the tube 2 and the opening 44 for the flow of beer.

With the $CO_2$ valve 83 open, the $CO_2$ gas passes from the $CO_2$ tank through the $CO_2$ hose 85 into the inlet 92 in the tap body 40, and into the upper openings 49 through the annular passage 51 to the lower openings 50 and into the barrel unit body chamber 38 and out through the holes 31 and and 32 controlled by the flutter valve 26 and into the space in the beer barrel 5 above the beer. Because of the regulated 12 to 14 pounds pressure on the beer, the beer passes into the bottom of the tube 2 and up the tube 2, past the valve 20 and through the opening 44 in the piston 43 to the tap head cavity 93 past the outlet 57 to the beer hose 84 and then to the faucet.

FIG. 14 shows the tap head 42 partially disassembled from the tap body 40. This arrangement allows the plunger 67 and plunger rod 66 together with the spring 69 to be removed from the piston 43 for cleaning purposes. The piston 43 is then free to be slid upwardly out of the tap body 40 and fastener 41 if desired. These parts do not have to be disasembled for tapping a barrel or to connect or disconnect the tap unit T to or from the barrel unit B. It is evident from this view that the projections 60 in the spring 59 are adapted to snap into and be retained in the annular groove 94 near the top of the tap unit body 40. By pressing the finger portions 62 of the overlapping ends of the spring 59 together, the projections 60 are withdrawn from the groove 94 thereby releasing the tap head 42 from the tap body 40.

It will be noted that the beer passage is straight and free from crevices or places which might be difficult to clean. The parts are preferably made from stainless steel and the few seals which might contact the beer, as well as the other seals, are made from material which is carefully selected so as to wear long and impart no undesirable taste to the beer. The parts are rugged in construction so that the extension is not bent or damaged if not inserted absolutely straight into the barrel. Also, the opening in the barrel unit is small enough and the beer valve 20 is positioned low enough that it cannot be opened by inserting one's finger.

It is recommended that draft beer systems be flushed after each day's use and this can be done easily by providing a small flask or bottle (not shown) having a barrel unit B and supply of a quart or more of water therein. At night, the operator simply disconnects the tap unit T from the barrel 5 by rotating the thumb lug 77 a few degrees to disengage the spring 71 from the groove 95 and pulls upwardly. This automatically closes the valves 83 and 20 by reason of the springs 69 and 22. The operator then inserts the tap unit T into the barrel unit B in the flush bottle which causes the valves 83 and 20 to open so that the $CO_2$ gas can force water upwardly past the valve 20 through the opening 44 and into the beer line 84 to the faucet, thereby flushing out tap unit T and the line from said unit to the faucet. Water is allowed to remain in the line during periods of non-use.

When the operator again wants to dispense beer, he merely disconnects the tap unit T from the flush bottle and inserts or snaps it into place in the beer barrel 5. Opening the draft beer faucet then allows the $CO_2$ gas to force beer out of the barrel and up through the tube 2 and the opening 44 to the beer hose 84 pushing the water in the line ahead of it. The faucet is closed when the water has been removed and beer starts flowing. The system is then ready for use for drawing beer.

If desired, the tap unit T can be inserted into the standard bottom opening of a standard barrel instead of the top opening thereof. This is more inconvenient for the operator, but eliminates the necessity of a long curved tube 2 and requires only a very short tube (not shown) in order to dispense the last few ounces from a barrel of beer. Of course, the bottom opening would have to be provided with a barrel unit B such as is shown for the top opening in the drawings. This arrangement would have the further disadvantage of having the flutter valve 26 positioned in the beer at all times, but since it is a one-way valve, no beer will pass from the barrel into the valve casing 13, especially since the pressure inside the casing 13 will be equal to or greater than that on the beer side.

This invention is intended to cover all changes and modifications of the example of the invention herein chosen for purposes of the disclosure, which do not constitute departures from the spirit and scope of the invention.

What I claim is:

1. A beer barrel tapping device comprising a tap unit and a barrel unit, said barrel unit adapted to be fixedly positioned in the top opening of a conventional beer barrel, said barrel unit having a casing with a beer tube extending downwardly therefrom to a point adjacent to the lowest portion of the bottom of said beer barrel, said barrel unit having a normally closed beer valve therein and a one-way gas outlet valve therein, said tap unit having a gas inlet and a beer outlet and a quick connector for quickly connecting said tap unit to said barrel unit, said tap unit having a portion adapted to be inserted into said barrel unit, said tap unit having a movable member and a gas valve therein, and means for automatically opening said gas valve and said beer valve when said tap unit is inserted into assembled relation with said barrel unit and for automatically closing said valves when said tap unit is withdrawn therefrom.

2. A beer barrel tapping device comprising a tap unit and a barrel unit, said barrel unit adapted to be fixedly positioned in the upper opening of a conventional beer barrel, said barrel unit positioned within said barrel and having a casing with a beer tube extending downwardly therefrom to a point adjacent to the bottom of said beer barrel, said barrel unit having a normally closed beer valve therein to prevent beer from flowing upwardly out of said upper opening and a gas opening for allowing gas to pass from within said barrel unit into said barrel, said tap unit having a beer outlet and a gas inlet and a quick connector for quickly connecting said tap unit to said barrel unit by pushing the tap unit into the barrel unit, said tap unit having a plunger therein adapted to contact and open said beer valve and a gas valve therein opening when said tap unit and barrel unit are in assembled relation, thereby allowing gas to pass from said tap unit into said barrel unit and through said gas opening into the beer barrel and allowing the gas to force beer upwardly past the beer valve and into the tap unit.

3. A beer barrel tapping device comprising a tap unit and a barrel unit, said barrel unit adapted to be secured inside a conventional beer barrel adjacent to an opening therein, said barrel unit having a casing with a one-way gas valve therein and a hollow beer tube extending downwardly to the lowest portion of the bottom of said beer valve, said barrel unit having a normally closed beer valve positioned therein, said tap unit having a gas inlet and a beer outlet and a quick connector for quickly connecting said tap unit to said beer barrel and barrel unit, said tap unit having an extension thereon with a plunger extending therethrough, a piston slidably mounted in said tap unit, said piston also being in movable relation with said plunger, said piston forming a portion of a normally closed gas valve in said tap unit, said plunger adapted to open said beer valve and said piston adapted to open said gas valve when said tap unit is connected to said barrel unit, said beer valve and said gas valve being closed automatically upon withdrawal of said tap unit from said barrel unit, said extension having gas passage means therein for allowing gas to pass from said tap unit into said barrel unit and then through said barrel unit gas valve and into said barrel, thereby creating a pressure on the beer to force it upwardly through the beer tube and past the beer valve.

4. A beer barrel tapping device comprising a tap unit and a barrel unit, said barrel unit adapted to be secured inside a conventional beer barrel in an opening therein, said barrel unit having a one-way gas valve therein and a hollow beer tube extending downwardly therefrom to the bottom of said beer barrel, said barrel unit having a beer valve positioned therein above said beer tube, said tap unit having a gas inlet and a beer outlet and a quick connector for quickly connecting said tap unit to said barrel unit, said tap unit having an extension therein with a plunger extending therethrough, said extension preventing communication between said beer valve and said one-way gas valve, a piston slidably mounted in said tap unit in movable relation with said plunger, means for normally biasing said one-way gas valve and said beer valve to their closed positions, said plunger positioned in alignment with and adapted to open said beer valve and said piston opening said gas valve when said tap unit is connected to said barrel unit, said means closing said beer valve and said gas valve automatically upon withdrawal of said tap unit from said barrel unit, said extension having gas passage means therein for allowing gas to pass from said tap unit to said barrel unit, said gas then adapted to pass through said barrel unit gas valve into said barrel thereby creating a pressure on the beer to force it upwardly through the beer tube and tapping device.

5. A beer barrel tapping device comprising a tap unit and a barrel unit, said barrel unit adapted to be secured inside a conventional beer barrel in an opening therein, said barrel unit having a casing with a one-way gas valve therein and a hollow beer tube extending downwardly therefrom to the lowest portion of the bottom of said beer barrel, said barrel unit having a beer valve positioned therein above said beer tube, said tap unit having a gas inlet and a beer outlet and a quick connector for quickly connecting said tap unit to said barrel unit, said tap unit having an extension therein with a plunger extending therethrough, said extension having a tubular portion for preventing communication between said beer valve and said one-way gas valve, a piston slidably mounted in said tap unit in movable relation with said plunger, a spring for normally biasing said one-way gas valve to its closed position and a spring for normally biasing said beer valve to its closed position, said piston forming a portion of a gas valve in said tap unit, said plunger positioned in alignment with and adapted to open said beer valve and said piston opening said gas valve thereby compressing said springs when said tap unit is connected to said barrel unit, said springs closing said beer valve and said gas valve automatically upon withdrawal of said tap unit from said barrel unit, said extension having gas passage means therein for allowing gas to pass from said tap unit to said barrel unit, said gas then being free to pass through said barrel unit gas valve into said barrel thereby creating a pressure on the beer to force it upwardly through the beer tube and tapping device.

References Cited in the file of this patent

UNITED STATES PATENTS

| | | |
|---|---|---|
| 701,335 | Handy | June 3, 1902 |
| 2,223,012 | Wanderski | Nov. 26, 1940 |
| 2,539,349 | Giles | Jan. 23, 1951 |
| 2,629,614 | Valentine | Feb. 24, 1953 |
| 2,638,914 | Flaith | May 19, 1953 |